(12) United States Patent
Haddock

(10) Patent No.: US 10,908,476 B2
(45) Date of Patent: *Feb. 2, 2021

(54) DYNAMIC DIFFRACTIVE LIQUID CRYSTAL LENS

(71) Applicant: Verily Life Sciences LLC, South San Francisco, CA (US)

(72) Inventor: Joshua N. Haddock, Mountain View, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,596

(22) Filed: Sep. 19, 2019

(65) Prior Publication Data

US 2020/0012167 A1   Jan. 9, 2020

Related U.S. Application Data

(63) Continuation of application No. 14/937,135, filed on Nov. 10, 2015, now Pat. No. 10,437,129.

(51) Int. Cl.
*G02F 1/29* (2006.01)
*G02F 1/1337* (2006.01)
(Continued)

(52) U.S. Cl.
CPC .............. *G02F 1/292* (2013.01); *G02C 7/04* (2013.01); *G02C 7/083* (2013.01); *G02F 1/1337* (2013.01);
(Continued)

(58) Field of Classification Search
CPC ........... G02C 7/083; G02C 7/04; G02F 1/292; G02F 1/29; G02F 1/1347; G02F 1/1337; G02F 2001/133742
See application file for complete search history.

(56) References Cited

U.S. PATENT DOCUMENTS 7,710,535 B2   5/2010 Nomura et al.
7,764,354 B2   7/2010 Ooi et al.
(Continued)

FOREIGN PATENT DOCUMENTS

CN        1397824 A     2/2003
CN      104102022 A    10/2014
(Continued)

OTHER PUBLICATIONS

Notice of Reasons for Rejection issued for Japanese Patent Application No. 2018-515271 dated Apr. 23, 2019, 20 pages.
(Continued)

*Primary Examiner* — Jessica M Merlin
(74) *Attorney, Agent, or Firm* — Christensen O'Connor Johnson Kindness PLLC

(57) ABSTRACT

In an embodiment, a multi-layer lens stack includes first liquid crystal material enclosed between a first diffractive lens structure and a first substrate surface having a first alignment layer disposed thereon and second liquid crystal material enclosed between a second diffractive lens structure and a second substrate surface having a second alignment layer disposed thereon. The first and second liquid crystal materials assume a homeotropic alignment relative to the first and second substrate surfaces, respectively, in a first mode. The first and second alignment layers are respectively configured to align the first liquid crystal material along a first direction and the second liquid crystal material along a second direction, substantially orthogonal to the first direction, in a second mode. The multi-layer lens stack has a first optical power in the first mode and a second optical power, different from the first optical power, in the second mode.

20 Claims, 5 Drawing Sheets

(51) Int. Cl.
*G02C 7/04* (2006.01)
*G02C 7/08* (2006.01)
*G02F 1/1347* (2006.01)

(52) U.S. Cl.
CPC ............ *G02F 1/1347* (2013.01); *G02F 1/29* (2013.01); *G02F 2001/133742* (2013.01)

(56) References Cited

U.S. PATENT DOCUMENTS

| | | | |
|---|---|---|---|
| 7,773,489 | B2 | 8/2010 | Murata et al. |
| 10,437,129 | B2* | 10/2019 | Haddock .................. G02F 1/29 |
| 2003/0210377 | A1 | 11/2003 | Blum et al. |
| 2007/0159562 | A1 | 7/2007 | Haddock et al. |
| 2007/0216851 | A1 | 9/2007 | Matsumoto |
| 2008/0180630 | A1 | 7/2008 | Clarke et al. |
| 2012/0212696 | A1 | 8/2012 | Trajkovska et al. |
| 2013/0166025 | A1 | 6/2013 | Pugh et al. |
| 2013/0258275 | A1 | 10/2013 | Toner et al. |
| 2015/0077663 | A1 | 3/2015 | Pugh et al. |

FOREIGN PATENT DOCUMENTS

| | | | |
|---|---|---|---|
| JP | 2005505789 | A | 2/2005 |
| JP | 2008090259 | A | 4/2008 |
| JP | 2009523263 | A | 6/2009 |
| JP | 6161128 | B2 | 7/2017 |
| WO | 2014132781 | A1 | 9/2014 |

OTHER PUBLICATIONS

Examination Report No. 1 issued for Australian Patent Application No. 2016351444 dated Aug. 15, 2018, 3 pages.
Examination Report No. 2 issued for Australian Patent Application No. 2016351444 dated Dec. 18, 2018, 3 pages.
PCT/US2016/057134—International Search Report and Written Opinion, dated Jan. 16, 2017, 13 pages.
Woo et al., Polarization-insensitive liquid crystal Fresnel lens of dynamic focusing in an orthogonal binary configuration, May 17, 2006.
Wang et al., "Liquid crystal lens with stacked structure of liquid-crystal layers", Jun. 15, 2005.
Japanese Decision of Rejection, with English Translation, based on Japanese Patent Application No. 2018-515271, dated Jan. 6, 2020, 8 pages.
Chinese Office Action dated Oct. 22, 2020 for corresponding Chinese Patent Application No. 201680065147.6, 9 pages.
Indian Office Action, dated Nov. 24, 2020, in corresponding Indian Patent Application No. 201847011366, 6 pages.

* cited by examiner

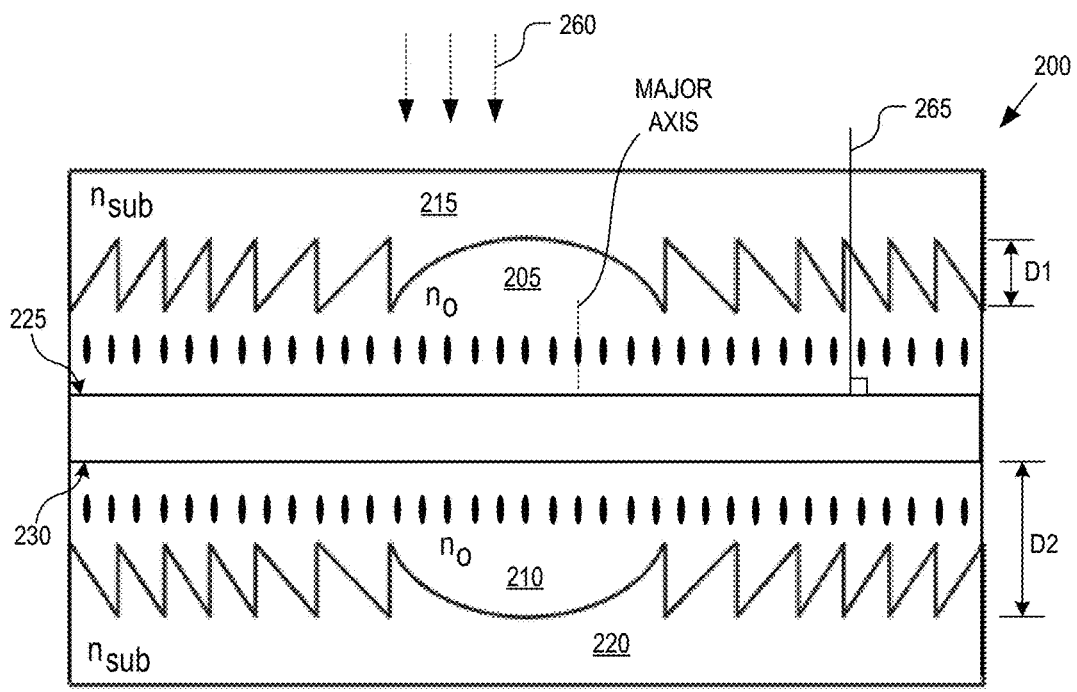
FIG. 2A
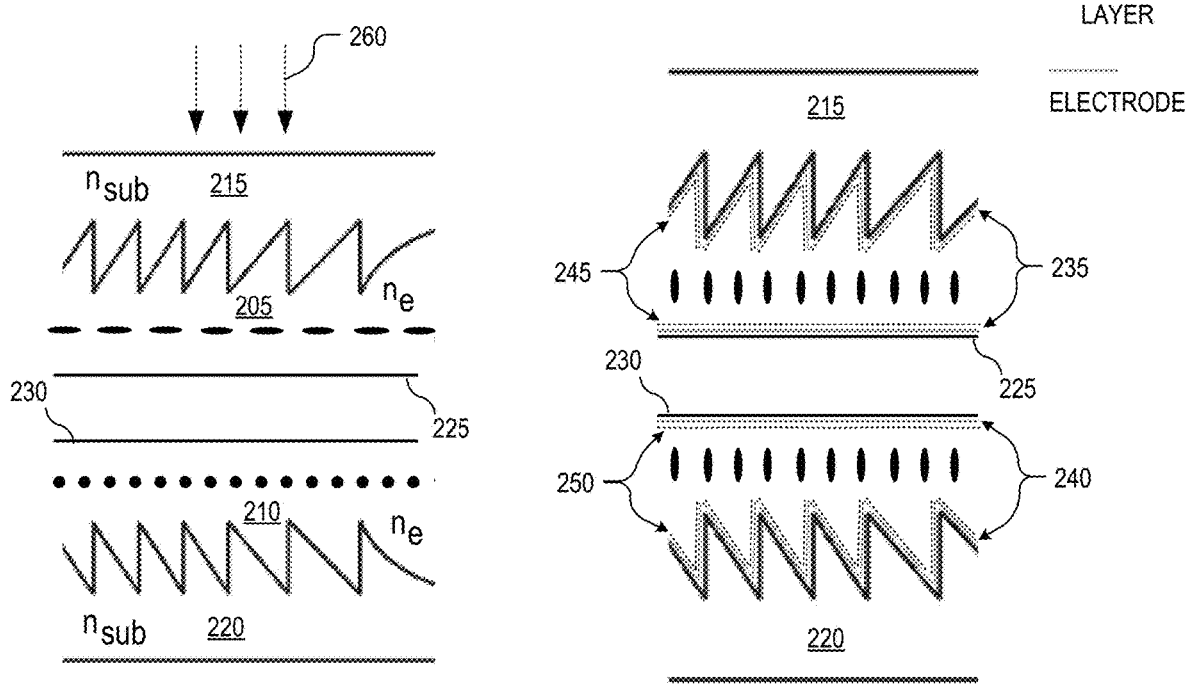
FIG. 2B
FIG. 2C

DYNAMIC DIFFRACTIVE LIQUID CRYSTAL LENS

REFERENCE TO RELATED APPLICATION

This application is a continuation of U.S. application Ser. No. 14/937,135, filed on Nov. 10, 2015, all of which contents are hereby incorporated by reference.

TECHNICAL FIELD

This disclosure relates generally to the field of optics, and in particular but not exclusively, relates to ophthalmic devices such as contact lenses and intraocular lenses.

BACKGROUND INFORMATION

Accommodation is a process by which the eye adjusts its focal distance to maintain focus on objects of varying distance. Accommodation is a reflex action (but can be consciously manipulated) and is controlled by contractions of the ciliary muscle.

As an individual ages, the effectiveness of the ciliary muscle degrades. Presbyopia is a progressive age-related loss of accommodative or focusing strength of the eye, which results in increased blur at near distances. This loss of accommodative strength with age has been well studied and is relatively consistent and predictable. Presbyopia affects nearly 1.7 billion people worldwide today (110 million in the United States alone) and that number is expected to substantially rise as the world's population ages. Techniques and devices that can help individuals offset the effects of Presbyopia are increasingly in demand.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIGS. 2A-C are cross-sectional illustrations of a dynamic diffractive liquid crystal lens, in accordance with an embodiment of the disclosure.

DETAILED DESCRIPTION

Embodiments of an ophthalmic lens system including a dynamic diffractive liquid crystal lens are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
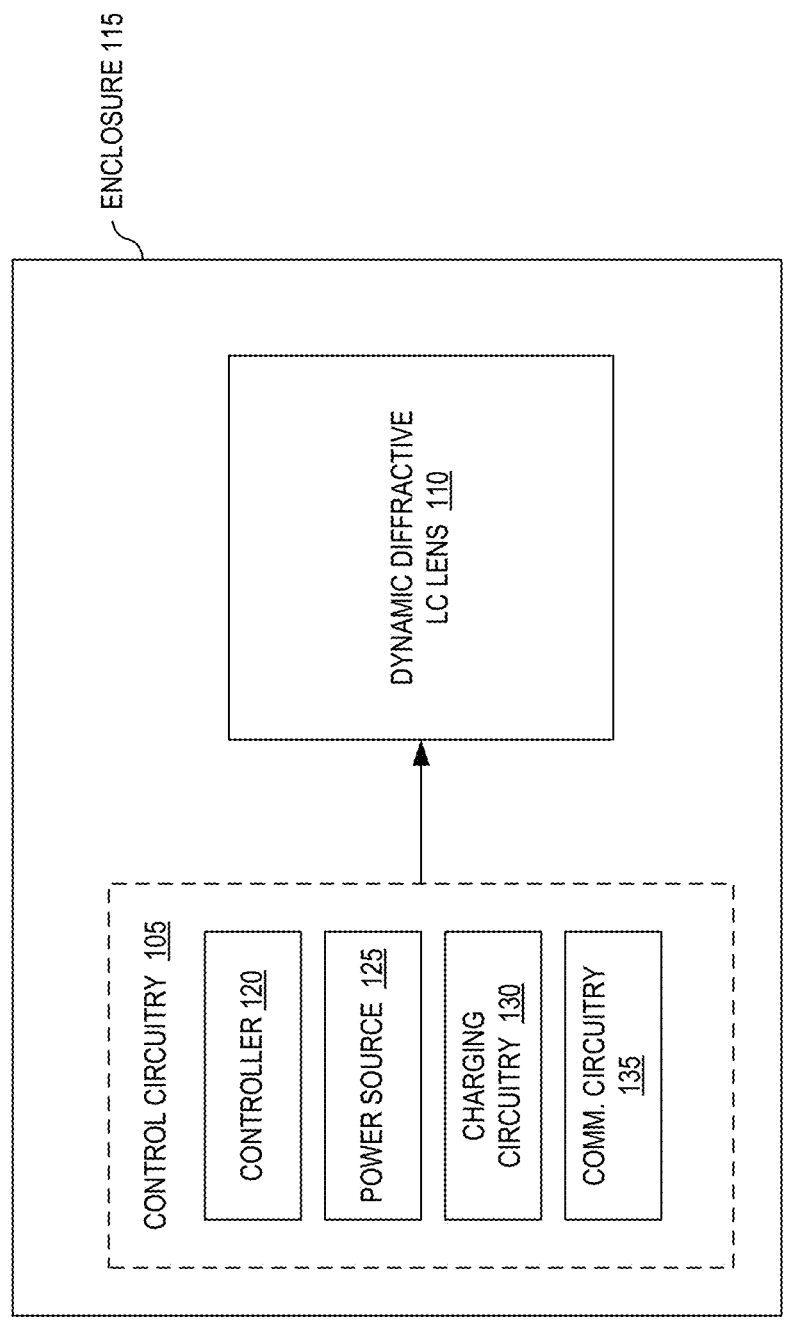
FIG. 1 is a functional block diagram of an ophthalmic lens system including a dynamic diffractive liquid crystal lens, in accordance with an embodiment of the disclosure.

FIG. 1 is a functional block diagram of an ophthalmic lens system 100 including a dynamic diffractive liquid crystal lens, in accordance with an embodiment of the disclosure. The illustrated embodiment of ophthalmic lens system 100 includes control circuitry 105, dynamic diffractive liquid crystal ("LC") lens 110, and an enclosure 115. The illustrated embodiment of control circuitry 105 includes a controller 120, a power source 125, charging circuitry 130, and communication circuitry 135.

Ophthalmic lens system 100 may be implemented as a smart contact lens that mounts over a user's eye or as an intraocular lens ("IOL") that may be implanted into the anterior chamber, the posterior chamber, or other locations of the user's eye. In various embodiments, both control circuitry 105 and dynamic diffractive LC lens 110 are disposed within enclosure 115. Enclosure 115 is an optically transmissive material (e.g., transparent, clear, etc.) that seals the internal components and protects the eye. Enclosure 115 may have concave and convex surfaces similar to a contact lens, have generally flat surfaces, or otherwise in various embodiments. In a contact lens embodiment, enclosure 115 may be implemented as a hydrogel or other permeable polymer material that permits oxygen to reach the eye, or non-permeable materials (e.g., glass, plastic, silicon) may also be used. In an IOL embodiment, enclosure 115 may be implemented as a silicon enclosure, or other hermetically sealable materials. Of course, other optically transmissive and biocompatible materials may be used.

Controller 120 includes the logic that coordinates the operation of the other components of ophthalmic lens system 100. Controller 120 may be implemented as hardware logic (e.g., application specific integrated circuit, field programmable gate array, etc.), software/firmware logic executed on a general purpose microcontroller, or a combination of both hardware and software/firmware logic. Power source 125 may be implemented using a variety of power storage devices including a rechargeable battery and/or capacitive elements. Charging circuitry 130 is coupled to power source 125 for charging power source 125 and may include an inductive charging element, a photovoltaic element, a microelectromechanical systems ("MEMS") charging unit that uses natural motion to generate a current, or otherwise. Communication circuitry 135 is coupled to controller 120 to provide external communications therewith. Communication circuitry 135 may include a passive backscatter antenna (e.g., RFID tag) or an active antenna if power budgets permit.

Ophthalmic lens system 100 includes dynamic diffractive LC lens 110 to provide variable optical power that may be dynamically adjusted during operation under the coordination and influence of control circuitry 105. In one embodiment, dynamic diffractive LC lens 110 has two modes of operation each with a different optical power. These modes are activated under electrical influence from control circuitry 105. In one embodiment, the first mode provides a first optical power for distance vision and the second mode provides a second optical power, different from the first optical power, for short distance vision (e.g., reading or computer monitor distances). In one embodiment, the first mode is a default mode that persists in the absence of an applied voltage while the second mode persists when control circuitry 105 is actively applying a bias voltage to dynamic diffractive LC lens 110. This configuration provides a fail-safe mode where the user's vision defaults to distance vision (e.g., for driving) should control circuitry 105 fail or run out of power.

FIGS. 2A-C are cross-sectional illustrations of a dynamic diffractive LC lens 200, in accordance with an embodiment of the disclosure. Dynamic diffractive LC lens 200 is one possible implementation of dynamic diffractive LC lens 110. FIG. 2A illustrates a cross-sectional illustration of dynamic diffractive LC lens 200 while FIG. 2C is a close-up illustration of a portion of the same showing details of electrode pairs and alignment layers. The illustrated embodiment includes LC material 205, LC material 210, diffractive lens structure 215, diffractive lens structure 220, substrate surfaces 225 and 230, electrode pair 235, electrode pair 240, alignment layers 245, and alignment layers 250 (note, the electrode pairs and alignment layers are only illustrated in FIG. 2C so as not to clutter the other drawings).

LC material 205 is enclosed between diffractive lens structure 215 and substrate surface 225 while LC material 210 is enclosed between diffractive lens structure 220 and substrate surface 230. These structures are vertically aligned to form a multi-layer lens stack. This multi-layer lens stack can be operated in at least one of two modes. In the first mode, LC materials 205 and 210 assume a homeotropic alignment (illustrated in FIGS. 2A and 2C) relative to substrate surfaces 225 and 230. The first mode causes the multi-layer lens stack to have a first optical power. In the second mode, a voltage is applied across LC materials 205 and 210 causing the liquid crystals to orient themselves as illustrated in FIG. 2B. The second mode causes the multi-layer lens stack to have a second optical power, different from the first optical power. The first and second optical powers of the first and second modes, respectively, refer to the optical power experienced by light 260 incident through the multi-layer lens stack along a trajectory 265 that is substantially normal to substrate surfaces 225 and 230.

The difference in optical power between the first mode and the second mode stems from the different refractive index experienced by light 260 as it passes through LC materials 205 and 210 depending upon its orientation. In the first mode, LC materials 205 and 210 are both oriented such that light 260 experiences the ordinary refractive index ($n_o$). In the illustrated embodiment, the first mode occurs when the major axis of both LC materials 205 and 210 aligns perpendicular or vertical to substrate surfaces 225 and 230, respectively. This alignment is referred to as homeotropic alignment. The ordinary refractive index $n_o$ is polarization insensitive (i.e., non-birefringent) for light 260 incident parallel to the major axis. In the first mode, the LC materials 205 and 210 are both homeotropicaly aligned and therefore the collective lens structure of the multi-layer lens stack is polarization insensitive along normal trajectory 265.

If diffractive lens structures 215 and 220 are formed of a clear or optically transmissive material having a refractive index of $n_{sub}$, then the interface between LC materials 205/210 and diffractive lens structures 215/220 has an index difference of $|n_o - n_{sub}|$ in the first mode. If the difference is greater than zero, then the diffraction grating of diffractive lens structures 215 and 220 will have optical power. If the difference is zero, the interface has no index difference and the diffraction grating of diffractive lens structures 215 and 220 will have no optical power. The diffraction efficiency changes with increasing mismatch in the refractive indexes of diffractive lens structures 215 and 220 and LC materials 205 and 210, respectively.

In the second mode, LC materials 205 and 210 orient themselves orthogonally to the homeotropic alignment position and orthogonally to each other (see FIG. 2B). In one embodiment, the second mode is activated via the application of voltages across LC materials 205 and 210 via electrode pairs 235 and 240. This realignment of the LC materials 205 and 210 causes light 260 incident along the normal trajectory 265 to experience the extraordinary refractive index ($n_e$). Referring to FIG. 2B, during the second mode the major axis of LC material 205 is aligned horizontally while the major axis of LC material 210 is aligned orthogonally into the page. In this orientation, LC materials 205 and 210 are birefringent or polarization sensitive along the normal trajectory 265 for light 260 where one polarization will see $n_o$ and the orthogonal polarization will see $n_e$. However, in the second mode, LC materials 205 and 210 are of orthogonal orientation as well, so that as light 260 passes through the multi-layer lens stack in the second mode, half of light 260 experiences the extraordinary refractive index $n_e$ when passing through LC material 205 and the other half experiences the extraordinary refractive index $n_e$ when passing through LC material 210. Accordingly, in the second mode, LC materials 205 and 210 are collectively polarization insensitive along the normal trajectory 265.

The alignment orientation of LC materials 205 and 210 is selected by both the application (or lack thereof) of voltages across electrode pairs 235 and 240 as well as the configuration of liquid crystal alignment layers 245 and 250 and the type of LC material itself (i.e., LC belonging to a class of materials that are characterized as having a negative dielectric anisotropy). It is the negative dielectric anisotropy characteristic that allows LC materials 205 and 210 to be homeotropically aligned (FIG. 2A) and orient in the presence of an applied voltage (FIG. 2B). The creation of liquid crystal alignment layers is known in the art. Example techniques for conditioning alignment layers 245 and 250 includes applying a rubbing direction or otherwise. In one embodiment, alignment layers are formed of a polyimide material. The alignment layers 245 and 250 are conditioned to provide orthogonal alignment between LC materials 205 and 210 in the presence of an applied voltage (illustrated in FIG. 2B). The orientation between LC materials 205 and 210 may be reversed via appropriate conditioning of alignment layers 245 and 250.

Electrode pairs 235 and 240 may be fabricated of a clear, conductive material such as indium tin oxide ("ITO") or otherwise. Electrode pairs 235 and 240 may share a common ground electrode (e.g., the electrodes on substrate surfaces 225 and 230 may be tied together) or not. In one embodiment, the voltages applied across electrode pairs 240 and 235 are alternating current ("AC") voltages (e.g., 4V rms).

In the illustrated embodiment, substrate surfaces 225 and 230 are opposite sides of a planar slab substrate. In one embodiment, diffractive lens structures 215 and 220 as well as the planar slab substrate are fabricated of a common material (e.g., PolyMethylMethAcrylate or PMMA) or other optically transmissive materials. In other embodiments, diffractive lens structures 215 and 220 are formed of a material having a common refractive index ($n_{sub}$), while substrate surfaces 225 and 230 may or may not have a different refractive index than $n_{sub}$.

In one embodiment, the materials used to form diffractive lens structures 215 and 220 are selected such that in the first mode when no voltage is applied across electrode pairs 235 and 240, $n_o$ approximately equals $n_{sub}$. The modulation depth (D1) of the surface relief diffractive optic structures can be given by:

$$D1 = \frac{\lambda}{(n_e - n_{sub})}, \quad \text{(Equation 1)}$$

where $\lambda$ is the design wavelength, which may be selected to be 550 nm (the peak of the photopic response of the human eye). In an embodiment where diffractive lens structures 215 and 220 are fabricated of PMMA having an $n_{sub}$=1.4928 at 550 nm and MLC-2079 available from EMD Performance Materials Corp. having an $n_e$=1.4937 at 550 nm, D1 is approximately 3.6 um. The overall thickness D2 of LC materials 205 and 210 can be less than 15 um thick and in some embodiments less than 10 um thick. This facilitates a relatively thin overall multi-layer lens stack well suited for use within a contact lens or IOL device. Of course other dimensions (larger or smaller) may be used. For example, D1 may be 3.6 um±1.4 um for peak photopic response within the visual spectrum. A dynamic diffractive LC lens based upon these materials and design principles can generate a polarization insensitive off-state (e.g., first mode) where the diffractive lens structures are nulled to the point of being nearly undetectable by the human eye and generate optical power in the on-state (e.g., second mode) with high efficiency and also be polarization insensitive. In one embodiment, the default off-state (e.g., first mode) is selected to be a state that corresponds to a user's distance vision while the active on-state (e.g., second mode) is selected to be a state that corresponds to a user's nearsighted vision (e.g., reading or computer vision). This configuration provides a safe default mode in the event of failure or power depletion. However, in other embodiments, the first and second modes may be reversed if desirable for a given application.

Figure 3:
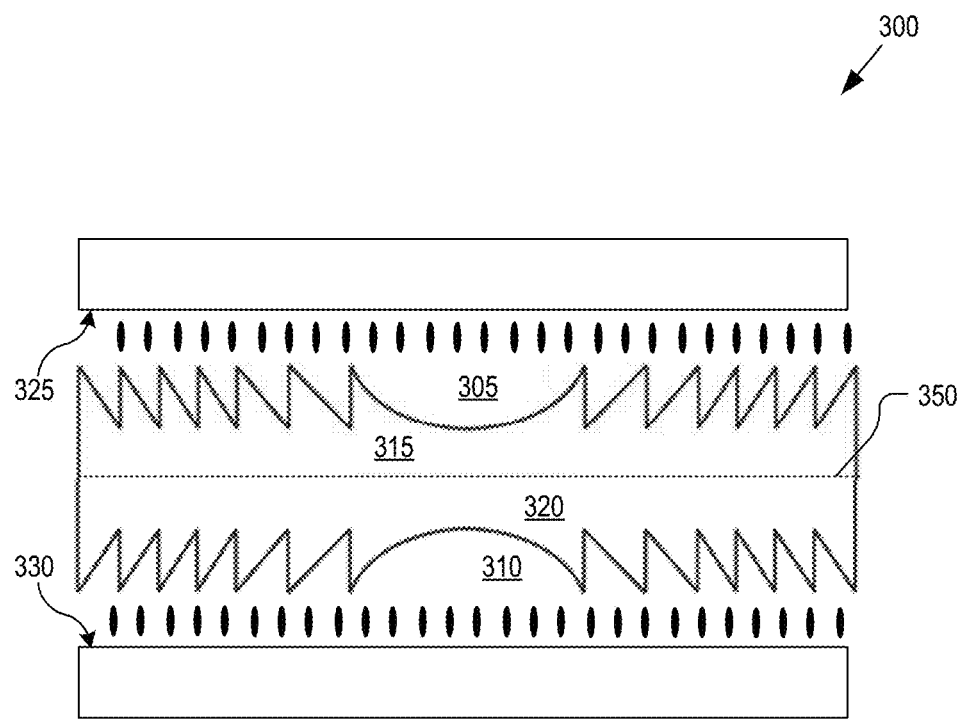
FIG. 3 is a cross-sectional illustration of a dynamic diffractive liquid crystal lens, in accordance with another embodiment of the disclosure.

FIG. 3 is a cross-sectional illustration of a dynamic diffractive LC lens 300, in accordance with another embodiment of the disclosure. Dynamic diffractive LC lens 300 is another possible implementation of dynamic diffractive LC lens 110 illustrated in FIG. 1. The illustrated embodiment of dynamic diffractive LC lens 300 includes LC material 305, LC material 310, diffractive lens structure 315, diffractive lens structure 320, and substrate surfaces 325 and 330. Though not illustrated, substrates surfaces 325 and 330 further include electrode pairs and alignment layers disposed thereon. Dynamic diffractive LC lens 300 operates in the same manner using the same principles as dynamic diffractive LC lens 200; however the orientation of diffractive lens structures 315/320 and substrate surfaces 325/330 have been switched to place diffractive lens structures 315 and 320 in the center surrounded by substrates surfaces 325 and 330. Diffractive lens structures 315 and 320 may be fabricated from a unitary component or from two separate elements bonded back-to-back along dotted line 350.

Figure 4A:
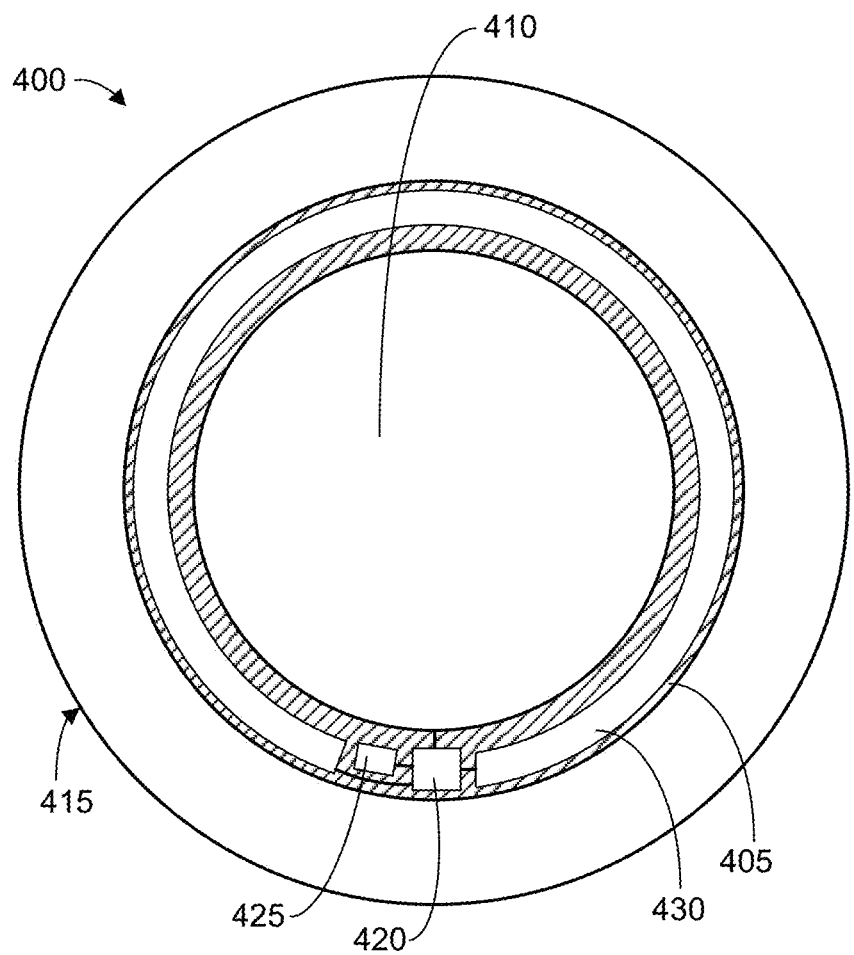
FIGS. 4A & B are illustrations of a contact lens system including a dynamic diffractive liquid crystal lens, in accordance with an embodiment of the disclosure.
Figure 4B:
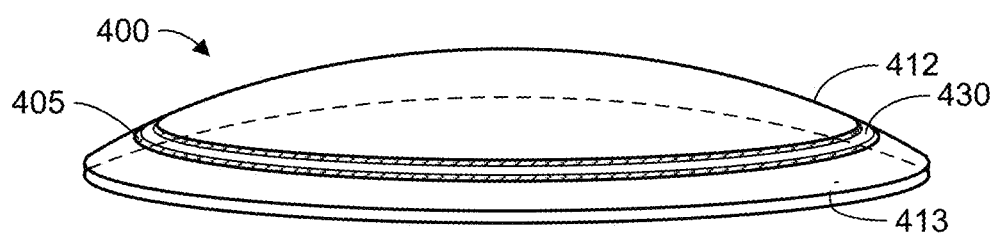

FIGS. 4A & B are illustrations of a contact lens system 400 including a dynamic diffractive liquid crystal lens, in accordance with an embodiment of the disclosure. Contact lens system 400 is one possible implementation of ophthalmic lens system 100 illustrated in FIG. 1. The illustrated embodiment of contact lens system 400 includes a substrate 405, a dynamic diffractive LC lens 410, an enclosure 415, a controller 420, a power source 425, and an antenna 430. Enclosure 415 has a size and shape that mounts over the cornea of an eye. In the illustrated embodiment, enclosure 415 includes an external side 412 having a convex shape and an eye-ward side 413 having a concave shape. Of course, contact lens system 400 may assume other shapes and geometries including a piggyback configuration that attaches to a surface of an eye-mountable carrier substrate having an overall shape that resembles a conventional contact lens.

In the illustrated embodiment, controller 420, power source 425, and antenna 430 are all disposed on ring-shaped substrate 405, which encircles dynamic diffractive LC lens 410. The components are all disposed within enclosure 415. In one embodiment, antenna 430 is coupled to controller 420 to operate as both a passive backscatter antenna for off-device communications and as an inductive charging antenna for charging power source 425. Dynamic diffractive LC lens 410 may be implemented with embodiments of dynamic diffractive LC lens 200 or 300.

Figure 5:
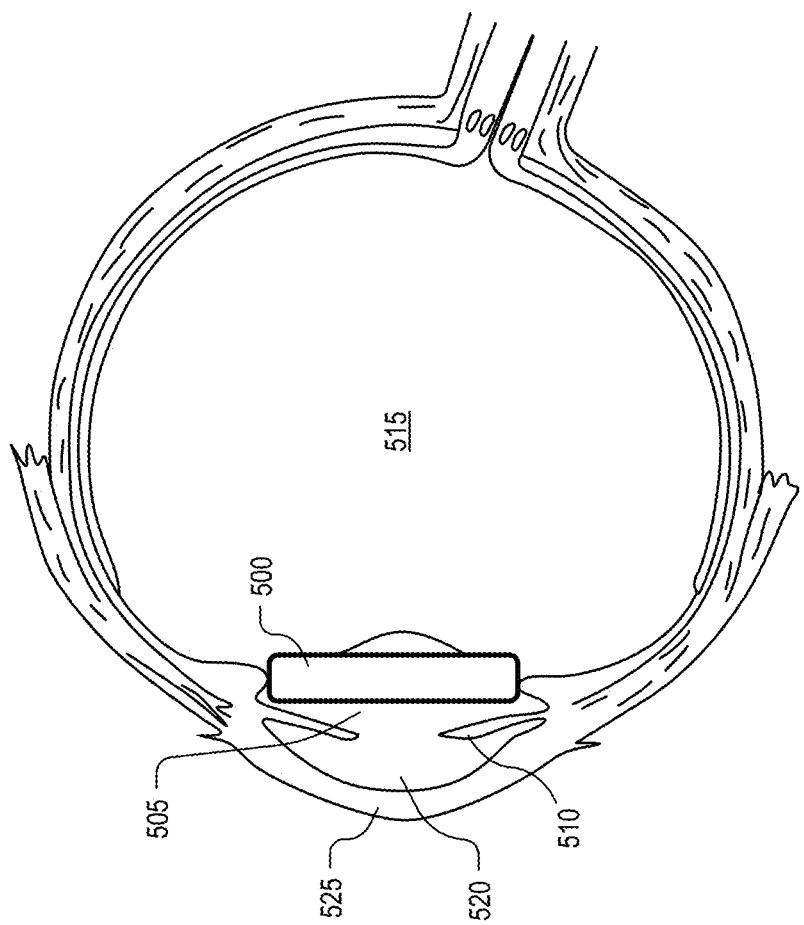
FIG. 5 is a cross-sectional illustration of an eye with an implanted intraocular lens system including a dynamic diffractive liquid crystal lens, in accordance with an embodiment of the disclosure.

FIG. 5 is a cross-sectional illustration of an eye 515 with an implanted IOL system 500 including a dynamic diffractive liquid crystal lens, in accordance with an embodiment of the disclosure. IOL system 500 is one possible implementation of ophthalmic lens system 100 illustrated in FIG. 1 and further may include an implementation of dynamic diffractive LC lens 200 or 300. IOL system 500 is illustrated as being implanted within the posterior chamber 505 behind iris 510. However, IOL system 500 may be implanted into other locations, as well, such as anterior chamber 520 disposed between iris 510 and cornea 525.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An ophthalmic apparatus, comprising:
   first liquid crystal material enclosed between a first diffractive lens structure and a first substrate surface having a first alignment layer disposed thereon; and
   second liquid crystal material enclosed between a second diffractive lens structure and a second substrate surface having a second alignment layer disposed thereon;
   wherein the first liquid crystal material, the second liquid crystal material, the first diffractive lens structure, and the second diffractive lens structure are arranged to form a multi-layer lens stack with a plurality of operational modes to provide variable optical power, wherein the plurality of operational modes includes at least a first mode to provide a first optical power and a second mode to provide a second optical power different than the first optical power, wherein in an absence of applied voltages across the first and second liquid crystal materials the ophthalmic apparatus defaults to the first mode to provide the first optical power, and wherein during the second mode the second optical power is provided, at least in part, by application of voltages across the first and second liquid crystal materials to align the first and second liquid crystal materials substantially orthogonal to each other.

2. The ophthalmic apparatus of claim 1, wherein during the first mode the first optical power is provided, at least in part, by a homeotropic alignment of the first and second liquid crystal materials with respect to the first substrate surface and the second substrate surface.

3. The ophthalmic apparatus of claim 2, wherein the first optical power provided by the first mode is for near vision.

4. The ophthalmic apparatus of claim 3, wherein the second optical power provided by the second mode is for distance vision.

5. The ophthalmic apparatus of claim 2, wherein during the second mode the first alignment layer is configured to align the first liquid crystal material along a first direction and the second alignment layer is configured to align the second liquid crystal material along a second direction, and wherein the first direction is orthogonal to the second direction.

6. The ophthalmic apparatus of claim 5, wherein the first direction and the second direction are orthogonal to the homeotropic alignment.

7. The ophthalmic apparatus of claim 1, wherein the plurality of operational modes further includes one or more additional modes dependent on the application of voltages across the first and second liquid crystal materials, and wherein each of the one or more additional modes provide a respective optical power different than the first optical power and the second optical power.

8. The ophthalmic apparatus of claim 1, wherein the first and second liquid crystal materials have a first refractive index during the first mode and a second refractive index, different than the first refractive index, during the second mode, for light incident through the multi-layer lens stack along a normal trajectory through the first and second substrate surfaces.

9. The apparatus of claim 8, wherein the first refractive index of the first and second liquid crystal materials is polarization insensitive along the normal trajectory in the first mode, wherein the second refractive index of the first and second liquid crystal materials are polarization sensitive along the normal trajectory in the second mode, and wherein the multi-layer lens stack is collectively polarization insensitive along the normal trajectory during the second mode.

10. The ophthalmic apparatus of claim 1, further comprising:
a first electrode pair disposed to apply a first voltage across the first liquid crystal material; and
a second electrode pair disposed to apply a second voltage across the second liquid crystal material, wherein the application of voltages includes the first voltage and the second voltage, and wherein the first and second electro pairs share a common ground.

11. The ophthalmic apparatus of claim 1, wherein the first and second diffractive lens structures are disposed between the first and second substrate surfaces.

12. The ophthalmic apparatus of claim 1, wherein first and second diffractive lens structures are each formed of clear plastic, having a modulation depth of approximately 3.6 μm±1.4 μm, and are less than 10 μm thick.

13. An ophthalmic lens system, comprising:
a diffractive liquid crystal ("LC") lens including:
first liquid crystal material enclosed between a first diffractive lens structure and a first substrate surface; and
second liquid crystal material enclosed between a second diffractive lens structure and a second substrate surface, wherein the first and second diffractive lens structures and the first and second liquid crystal materials are stacked; and
a controller coupled to the diffractive LC lens, the controller including logic that, when executed by the controller, will cause the ophthalmic lens system to perform operations comprising:
activating a first mode that homeotropically aligns the first and second liquid crystal materials to the first and second substrate surfaces, respectively, to induce a first optical power of the diffractive LC lens, wherein the first mode that homeotropically aligns both the first and second liquid crystal materials is a default mode of the diffractive LC lens that persists in an absence of applied voltages across both of the first and second liquid crystal materials; and
activating a second mode that aligns the first liquid crystal material along a first direction and aligns the second liquid crystal material along a second direction, substantially orthogonal to the first direction, to induce a second optical power of the diffractive LC lens, different from the first optical power.

14. The ophthalmic lens system of claim 13, wherein the first optical power of the first mode that persists in the absence of applied voltages across both of the first and second liquid crystal materials configures the diffractive LC lens for near vision.

15. The ophthalmic lens system of claim 14, wherein the second mode is activated by application of voltages across the first and second liquid crystal materials to align the first and second liquid crystal materials substantially orthogonal to each other.

16. The ophthalmic lens system of claim 14, wherein activating the second mode configures the diffractive LC lens for distance vision.

17. The ophthalmic lens system of claim 13, further comprising:
a first alignment layer disposed across the first substrate surface, the first alignment layer configured to cause the first liquid crystal material to align along the first direction upon activating the second mode; and
a second alignment layer disposed across the second substrate surface, the second alignment layer configured to cause the second liquid crystal material to align along the second direction upon activating the second mode.

18. The ophthalmic lens system of claim 13, wherein the first and second liquid crystal materials have a first refractive index during the first mode and a second refractive index, different than the first refractive index, during the second mode, for light incident through the diffractive LC lens along a normal trajectory through the first and second substrate surfaces, wherein the first refractive index of the first and second liquid crystal materials is polarization insensitive along the normal trajectory in the first mode, and wherein the second refractive index of the first and second liquid crystal materials are orthogonally polarization sensitive along the normal trajectory in the second mode, and wherein the diffractive LC lens is collectively polarization insensitive along the normal trajectory during the second mode.

19. The ophthalmic lens system of claim 13, further comprising:
   a first electrode pair disposed to apply a first voltage across the first liquid crystal material; and
   a second electrode pair disposed to apply a second voltage across the second liquid crystal material,
   wherein the second mode comprises application of the first and second voltages.

20. The ophthalmic lens system of claim 19, wherein the first and second electrode pairs share a common ground.

* * * * *